United States Patent
Tan et al.

(10) Patent No.: US 11,923,680 B2
(45) Date of Patent: Mar. 5, 2024

(54) METHODS AND APPARATUSES FOR IDENTIFYING POWER FEASIBLE REGION OF VIRTUAL POWER PLANT

(71) Applicant: Tsinghua University, Beijing (CN)

(72) Inventors: Zhenfei Tan, Beijing (CN); Haiwang Zhong, Beijing (CN); Qing Xia, Beijing (CN); Chongqing Kang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 578 days.

(21) Appl. No.: 17/164,265

(22) Filed: Feb. 1, 2021

(65) Prior Publication Data

US 2021/0184494 A1 Jun. 17, 2021

Related U.S. Application Data

(63) Continuation of application No. PCT/CN2019/116302, filed on Nov. 7, 2019.

(30) Foreign Application Priority Data

Oct. 29, 2019 (CN) .......................... 201911036748.6

(51) Int. Cl.
*H02J 13/00* (2006.01)
*G05B 17/02* (2006.01)
*H02J 3/00* (2006.01)
*H02J 3/24* (2006.01)

(52) U.S. Cl.
CPC ........ *H02J 13/00002* (2020.01); *G05B 17/02* (2013.01); *H02J 2203/20* (2020.01)

(58) Field of Classification Search
CPC .... H02J 13/00002; H02J 2203/20; H02J 3/00; H02J 3/48; H02J 3/24; H02J 3/50; G05B 17/02; Y02E 40/70; Y02E 60/00; Y04S 10/30; Y04S 10/50; Y04S 40/20
USPC ....................................................... 700/287
See application file for complete search history.

(56) References Cited

FOREIGN PATENT DOCUMENTS

CN           109146320 B   *  6/2021   ....... G06Q 10/06312

OTHER PUBLICATIONS

WIPO, ISR for PCT2019/116302, Jul. 27, 2020.

* cited by examiner

*Primary Examiner* — Michael J Brown
(74) *Attorney, Agent, or Firm* — Hodgson Russ LLP

(57) ABSTRACT

The disclosure provides a method for identifying a power feasible region of a virtual power plant, and an apparatus for identifying a power feasible region of a virtual power plant. The method includes: S1, obtaining operation basic data of the internal power-distribution system; S2, establishing a static safety-constrained model of the virtual power plant based on the operation basic data, in which the static safety-constrained model is based on alternating current power flow equations; S3, establishing a power feasible region model of the virtual power plant based on the static safety-constrained model; and S4, calculating the power feasible region model based on the operation basic data and a feasible region vertex enumeration algorithm to obtain the power feasible region of the virtual power plant.

10 Claims, 4 Drawing Sheets

METHODS AND APPARATUSES FOR IDENTIFYING POWER FEASIBLE REGION OF VIRTUAL POWER PLANT

CROSS-REFERENCE TO RELATED APPLICATION

This application is a continuation of International Application No. PCT/CN2019/116302 filed on Nov. 7, 2019, which claims priority to Chinese Patent Application No. 201911036748.6 filed on Oct. 29, 2019, the entire contents of which are incorporated by reference herein.

FIELD

The disclosure relates to the field of dispatching and operation technologies for power systems, and more particularly, to a method for identifying a power feasible region of a virtual power plant, and an apparatus for identifying a power feasible region of a virtual power plant.

BACKGROUND

The conventional dispatching and operation mode in the power system (which usually includes the power transmission grid and the power distribution network) has been unable to adapt to massive access of distributed energy resources into the power system. The conventional dispatching and operation mode is usually based on the decoupling of the power transmission grid and the power distribution network.

A power distribution system including distributed power generators (i.e., distributed energy resources), such as wind-power generators, photovoltaic generators, small-size gas turbines, demand response resources, user-side energy storages, and electric vehicles, may be referred as the virtual power plant. The virtual power plant may adjust active power and reactive power of its power distribution system, for exchanging power with the power transmission grid, at the gateway for accessing to the power transmission grid. Therefore, it is necessary to know the feasible range of active and reactive power that the virtual power plant can provide to the power transmission grid.

SUMMARY

In a first aspect, embodiments of the disclosure provide a method for identifying a power feasible region of a virtual power plant. The method includes: S1, obtaining operation basic data of the internal power-distribution system; S2, establishing a static safety-constrained model of the virtual power plant based on the operation basic data, in which the static safety-constrained model is based on alternating current power flow equations; S3, establishing a power feasible region model of the virtual power plant based on the static safety-constrained model; and S4, calculating the power feasible region model based on the operation basic data and a feasible region vertex enumeration algorithm to obtain the power feasible region of the virtual power plant.

In a second aspect, embodiments of the disclosure provide an apparatus for identifying a power feasible region of a virtual power plant. The apparatus includes: a memory; a processor; and a computer program stored on the memory and capable of running on the processor. The processor is configured to execute the computer program to implement actions of the method according to any possible implementation of the first aspect.

BRIEF DESCRIPTION OF THE DRAWINGS

In order to clearly illustrate embodiments of the disclosure or technical solutions in the related art, a brief description of drawings used in embodiments or in the related art descriptions is given below. Obviously, the drawings in the following descriptions are only part embodiments of the disclosure, and for those skilled in the art, other drawings can be obtained according to these drawings without creative labor.

DETAILED DESCRIPTION

In order to make objectives, technical solutions, and advantages of embodiments of the disclosure clearer, the technical solutions of the embodiments of the disclosure will be described clearly and completely in conjunction with the accompanying drawings of the embodiments of the disclosure. Obviously, the described embodiments are part embodiments of the disclosure, but not all the embodiments. Based on the embodiments of the disclosure, all other embodiments obtained by those of ordinary skill in the art without creative work shall fall within the protection scope of the disclosure.

Figure 1:
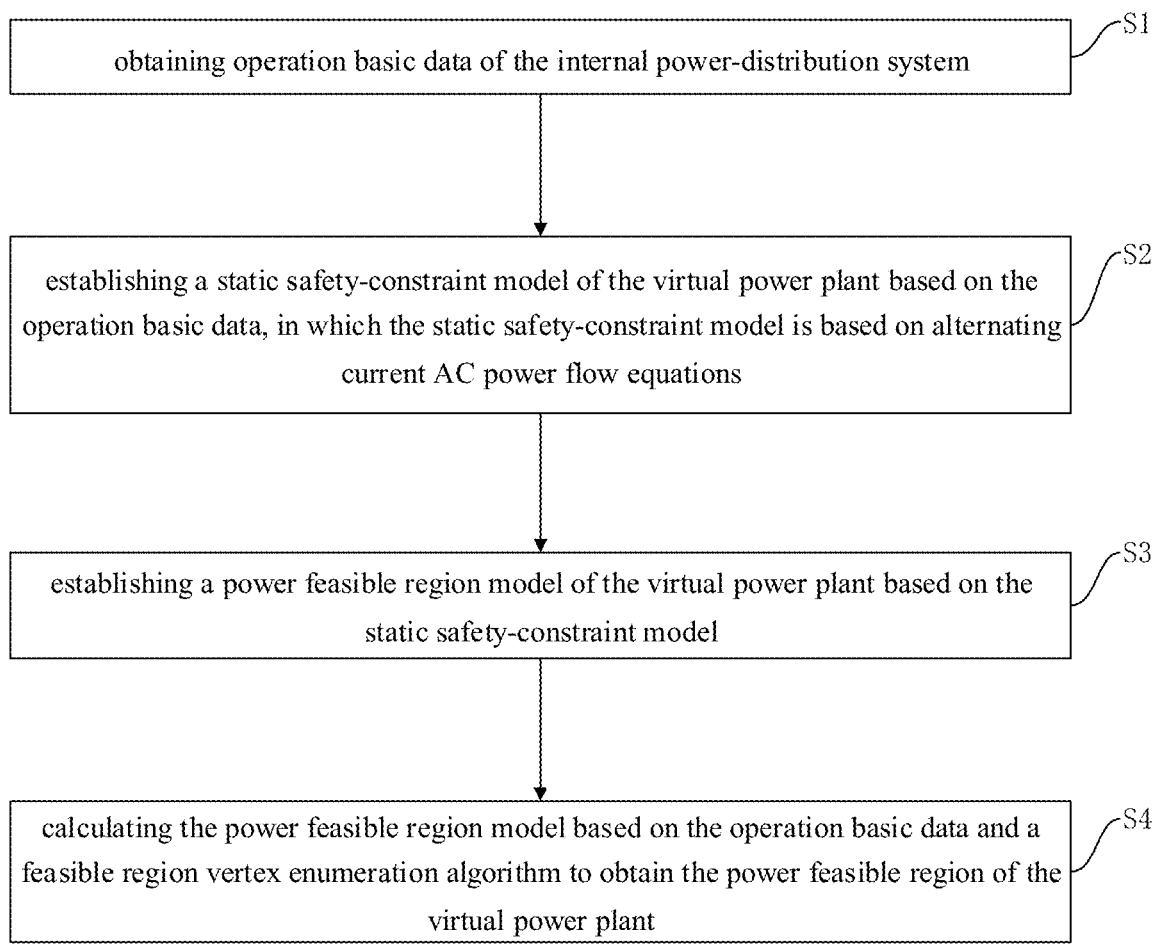
FIG. 1 is a flowchart of a method for identifying a power feasible region of a virtual power plant according to some embodiments of the disclosure.

FIG. 1 is a flowchart of a method for identifying a power feasible region of a virtual power plant according to some embodiments of the disclosure. As illustrated in FIG. 1, the method may include the following.

At S1, operation basic data of an internal power-distribution system of the virtual power plant is obtained.

The power distribution system including a distributed power generator such as a distributed wind-power generator, a distributed photovoltaic generator, a small-size gas turbine and a demand response resource, may be equivalent to the power plant. This power plant may be called as the virtual power plant. The active power and reactive power of the internal power-distribution system of the virtual power plant, for exchanging with the power transmission grid, at the gateway for accessing to the power transmission grid, may be adjusted based on dispatching instructions of a power grid dispatching center or clearing results of a power spot market.

The obtained operation basic data may include: a connection topology of the internal power-distribution system, a conductance and a susceptance of each of branches in the internal power-distribution system, a conductance and a susceptance of a transformer in the internal power-distribution system, a transmission capacity limit of each of the branches, upper and lower limits of node voltage allowed for safe operation, upper and lower limits of active and reactive power of each of distributed powers in the internal power-distribution system, and predicted active and reactive loads of each of load nodes in the internal power-distribution system.

At S2, a static safety-constrained model of the virtual power plant is established based on the operation basic data, in which the static safety-constrained model is based on alternating current power flow equations.

After obtaining the operation basic data of the internal power-distribution system of the virtual power plant, the static safety-constrained model of the virtual power plant may be established based on the operation basic data, in which the static safety-constrained model is based on alternating current power flow equations.

The static safety-constrained model is denoted by formulas of:

$$P_{ij}^f = g_{ij}(v_i^2 - v_i v_j \cos\theta_{ij}) - b_{ij} v_i v_j \sin\theta_{ij}, i \in L, j \in L_i \quad (1)$$

$$P_{ij}^f = g_{ij}(v_i^2 - v_i v_j \cos\theta_{ij}) - b_{ij} v_i v_j \sin\theta_{ij}, i \in L, j \in L_i \quad (1)$$

$$Q_{ij}^f = -b_{ij}(v_i^2 - v_i v_j \cos\theta_{ij}) - g_{ij} v_i v_j \sin\theta_{ij}, i \in L, j \in L_i \quad (2)$$

$$P_i^g - P_i^d = \sum_{j \in L_i} P_{ij}^f, P_0 = \sum_{j \in L_0} P_{j0}, i \in L \quad (3)$$

$$Q_i^g - Q_i^d = \sum_{j \in L_i} G_{ij}^f, Q_0 = \sum_{j \in L_0} Q_{j0}^f, i \in L \quad (4)$$

$$(P_{ij}^f)^2 + (Q_{ij}^f)^2 \leq (\overline{S}_{ij})^2, (P_0)^2 + (Q_0)^2 \leq (\overline{S}_0)^2, i \in L, j \in L_i \quad (5)$$

$$\underline{v}_i \leq v_i \leq \overline{v}_i, i \in L \quad (6)$$

$$\underline{P}_i^g \leq P_i^g \leq \overline{P}_i^g, \underline{Q}_i^g \leq Q_i^g \leq \overline{Q}_i^g, i \in L \quad (7)$$

where, the equation (1) represents an active power flow equation constraint of branch ij connecting directly node i and node j;

the equation (2) represents a reactive power flow equation constraint of branch ij;

$P_{ij}^f$ represents an active power flow of branch ij;
$Q_{ij}^f$ represents a reactive power flow of branch ij;
$b_{ij}$ represents a susceptance of branch ij;
$g_{ij}$ represents a conductance of branch ij;
$v_i$ represents a voltage amplitude of node i;
$v_j$ represents a voltage amplitude of node j;
$\theta_{ij}$ represents a difference of voltage phase angles between node i and node j;
L represents a set of nodes;
$L_i$ represents a set of nodes directly connected to node i through branches;

the equation (3) represents an active power balance equation constraint of node i;

the equation (4) represents a reactive power balance equation constraint of node i;

$P_i^g$ represents an active power output of node i;
$Q_i^g$ represents a reactive power output of node i;
$P_i^d$ represents an active power load of node i;
$Q_i^d$ represents a reactive power load of node i;
$P_0$ represents an active power output of the virtual power plant;
$Q_0$ represents a reactive power output of the virtual power plant;

the equation (5) represents a transmission capacity limit of branch ij and a transformer;

$\overline{S}_{ij}$ represents an upper transmission capacity limit of branch ij;

$\overline{S}_0$ represents an upper transmission capacity limit of a transformer;

the equation (6) represents an upper and lower limit constraint on node voltage;

$\underline{v}_i$ represents a lower limit of the voltage amplitude of node i;

$\overline{v}_i$ represents an upper limit of the voltage amplitude of node i;

the equation (7) represents an upper and lower limit constraint of active power output and active power output of the virtual power plant;

$\underline{P}_i^g$ represents a lower limit of the active power output of node i;

$\overline{P}_i^g$ represents an upper limit of the active power output of node i;

$\underline{Q}_i^g$ represents a lower limit of the reactive power output of node i; and $\overline{Q}_i^g$ represents an upper limit of the reactive power output of node i.

At S3, a power feasible region model of the virtual power plant is established based on the static safety-constrained model.

In detail, the power feasible region model of the virtual power plant is established based on the static safety-constrained model established above and a constraint aggregation theory, which may include the following.

At S31, a static safety-constrained feasible region of the virtual power plant is determined based on the power feasible region model (the equations (1) to (7)). The static safety-constrained feasible region is related to (v, θ, $P^g$, $Q^g$, $P_0$, $Q_0$), and is denoted by a formula of:

$$\Omega = \{(v, \theta, P^g, Q^g, P_0, Q_0) | s.t. (1) \sim (7)\} \quad (8)$$

where,
Ω represents the static safety-constrained feasible region;
v represents a vector with $v_i$ as elements,
θ represents a vector with $\theta_i$ as elements,
$P^g$ represents a vector with $P_i^g$ as elements,
$Q^g$ represents a vector with $Q_i^g$ as elements.

At S32, the static safety-constrained model (i.e., the static safety-constrained model constraints of the equations (1) to (7)) is aggregated by eliminating internal state variables v and θ, and internal decision variables $P^g$ and $Q^g$ of the virtual power plant, into the power feasible region model, in which the power feasible region model is related to constraints of the active power output of the virtual power plant and the reactive power output of the virtual power plant. The power feasible region model is denoted by a formula of:

$$\Phi = \left\{(P_0, Q_0) \middle| \begin{array}{l} \exists (v, \theta, P^g, Q^g), \\ s.t. (v, \theta, P^g, Q^g, P_0, Q_0) \in \Omega \end{array}\right\}, \quad (9)$$

where, Φ represents the power feasible region. The power feasible region is a bounded area in a two-dimensional space. The model aggregates the operation constraints of various distributed resources in the virtual power plant and the safe operation constraints of the power distribution network into the feasible region for the active and reactive power output of the virtual power plant, which may ensure that the output ($P_0$, $Q_0$) of the virtual power plant, satisfying constraints Φ, may be executed by the internal power-distribution system of the virtual power plant without violating static safety constraints.

At S4, the power feasible region model is calculated based on the operation basic data and a feasible region vertex enumeration algorithm to obtain the power feasible region of the virtual power plant.

Figure 2:
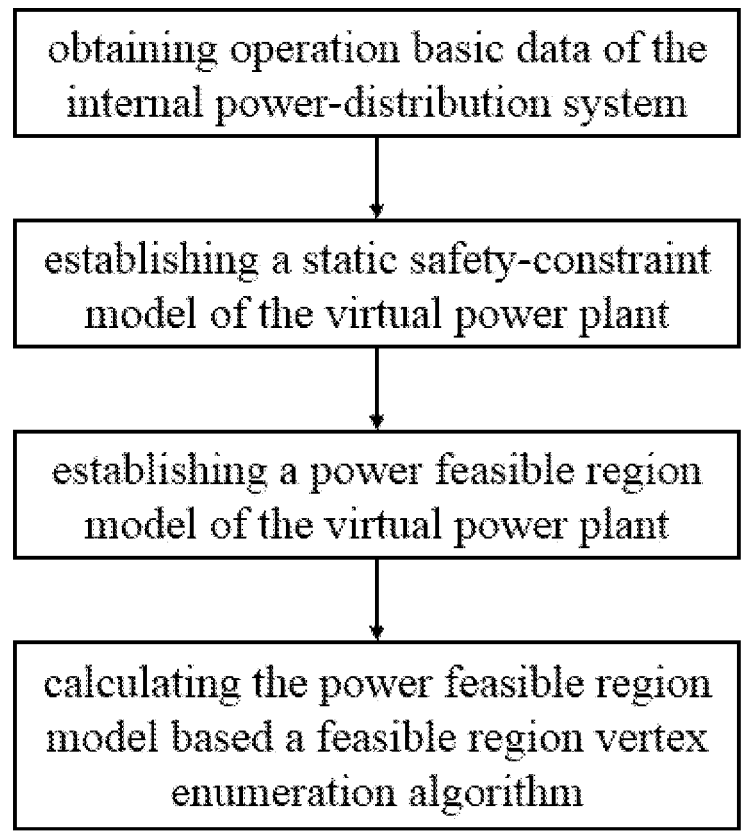
FIG. 2 is a flowchart of a method for identifying a power feasible region of a virtual power plant according to some embodiments of the disclosure.

The power feasible region model (also the feasible region of output of the virtual power plant) established in step S3 may be calculated by the feasible region vertex enumeration algorithm. This feasible region vertex enumeration algorithm translates boundaries of the existing approximate polygon outwards, searches for new vertices of Φ, and uses the new vertices obtained by searching to update the vertices in the approximate polygon, thereby continuously approaching the real feasible region of output of the virtual power plant or the power feasible region of the virtual power plant. As illustrated in FIG. 2, the specific process of using the vertex enumeration algorithm to calculate the feasible region of output of the virtual power plant or the power feasible region of the virtual power plant is described as follows.

At S41, the input of the algorithm includes the operation basic data and a preset error limit ε of the power feasible region. The error limit ε has a typical value within a range of 0.01~0.05, which may be preset according to calculation accuracy requirements.

At S42, a set of initial vertices and an initial approximate polygon of the power feasible region Φ are calculated based on the operation basic data.

The set of initial vertices of the power feasible region Φ includes 4 feasible region vertices and is calculated by solving an optimization problem of:

$$\max \alpha_P^{(m)} \cdot P_0 + \alpha_Q^{(m)} \cdot Q_0$$

$$s.t. (v, \theta, P^g, Q^g, P_0, Q_0) \in \Omega \quad (10)$$

where, $(\alpha_P^{(m)}, \alpha_Q^{(m)})$ represents coefficients of an objective function of the optimization problem, values of $(\alpha_P^{(m)}, \alpha_Q^{(m)})$ are taken as (1,1), (1, −1), (−1, 1), and (−1, −1) in sequence, and the equation (10) is solved through a nonlinear optimization algorithm or calling a nonlinear optimization solver to obtain a corresponding optimal solution of the optimization problem as $v_m = (P_0^{(m)}, Q_0^{(m)})^T$, $v_m$ is the $m^{th}$ initial vertex; a set $V_0 = \{v_1, v_2, v_3, v_4\}$ is formed by initial vertices, and a set of feasible region vertices is initialized as $V = V_0$; a set of equations for each boundary of a polygon formed by the initial vertices is recorded as $F^T$; an average value of the vertices in $V_0$ is calculated as $v_0 = (P_0^{(0)}, Q_0^{(0)})^T = (v_1 + v_2 + v_3 + v_4)/4$;

At S43, a set $F^N$ of newly added boundaries is initialized to be an empty set: $F^N \leftarrow \emptyset$.

At S44, vertices searching: boundary vertices of the power feasible region Φ are searched for by shifting boundaries in $F^T$ outward, in which for the $k^{th}$ boundary in Φ, a boundary equation is denoted by $f^{(k)}: \alpha_P^{(k)} \cdot P_0 + \alpha_Q^{(k)} \cdot Q_0 = \beta^{(k)}$, and vertices at both ends of the boundary are $v_1^{(k)}$ and $v_2^{(k)}$, and a search model is denoted by:

$$\max \alpha_P^{(k)} \cdot P_0 + \alpha_Q^{(k)} \cdot Q_0$$

$$s.t. (v, \theta, P^g, Q^g, P_0, Q_0) \in \Omega \quad (11)$$

the search model is solved by the nonlinear optimization algorithm (prime-dual interior point method) or calling the nonlinear optimization solver (such as Interior Point Optimizer (IPOPT)) to obtain an optimal solution of vertexes as $v_k = (P_0^{(k)}, Q_0^{(k)})^T$ and an optimal value of the vertexes is recorded as $g_k^{max}$.

At S45, updating the set of vertexes: the optimal solution of vertexes is added into the set v of feasible region vertices.

At S46, it is judged whether it is necessary to increase a boundary to be translated according to the error limit ε and an improvement amount of search in S44.

S461, the improvement amount in step S44 is denoted by:

$$\Delta g_k = \frac{g_k^{max} - \beta^{(k)}}{\beta^{(k)} - (\alpha_P^{(k)} \cdot P_0^{(0)} + \alpha_Q^{(k)} \cdot Q_0^{(0)})}. \quad (12)$$

S462, when $\Delta g_k > \varepsilon$, line equations $f_1^{(k)}$ and $f_2^{(k)}$ of $v_k$ with $v_1^{(k)}$ and $v_2^{(k)}$ are calculated, $f_1^{(k)}$ and $f_2^{(k)}$ are added into $F^N$, and it returns to step S44, and uses the $(k+1)^{th}$ boundary to perform a vertex search.

S463, when $\Delta g_k \leq \varepsilon$, it returns to step S44, and uses the $(k+1)^{th}$ boundary to perform a vertex search.

S47, after performing the vertex search on all boundaries in $F^T$, it is judged whether $F^T$ is an empty set.

S471, when $F^T$ is not the empty set, i.e., $F^N \neq 0$, $F^T$ is updated to $F^N$.

S472, when $F^T$ is the empty set, i.e., $F^N = 0$, the process ends and the polygon is determined according to the vertices in v, and the power feasible region is determined according to the determined polygon.

The polygon determined by the vertices in the vertex set v is the calculation result of the feasible region of output of the virtual power plant. The boundary inequalities of the polygon are the linear inequality constraints that represent the feasible region of output of the virtual power plant.

Figure 3:
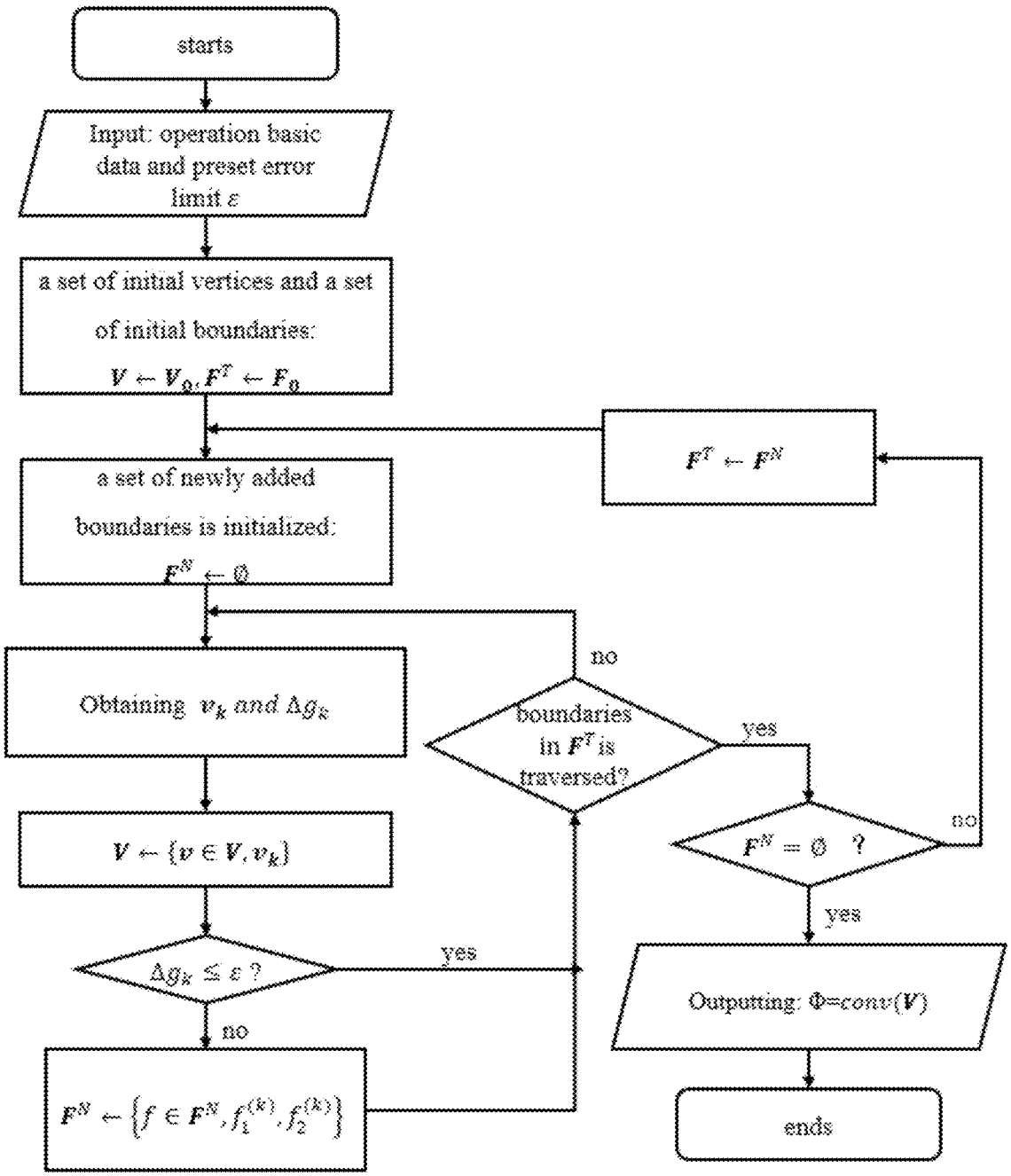
FIG. 3 is a flowchart of a method for identifying a power feasible region of a virtual power plant according to some embodiments of the disclosure.

As illustrated in FIG. 3, the overall flow chart of the embodiments of the disclosure is provided. The static safety-constrained model of the virtual power plant, based on the alternating current power flow equations, may be constructed by the obtained operation basic data of the internal power-distribution system, and the power feasible region model of the virtual power plant may be constructed based on the constraint aggregation theory, and the feasible region of output of the virtual power plant may be calculated by the feasible region vertex enumeration algorithm.

Through the above method, the technical gap that it cannot effectively consider the power feasible region of the virtual power plant when the virtual power plant participates in the optimization process of the transmission grid and the spot market, is filled. The operation constraints of various distributed resources in the virtual power plant and the safe operation constraints of the power distribution network are aggregated into explicit constraints on the active and reactive power output of the virtual power plant, and the feasible region of output of the virtual power plant allowed for safe operation is described, so that the virtual power plant can participate in the optimal dispatching and operation of the power system and the clearing of the power spot market, like a synchronous generator. It may ensure that the dispatching and clearing results of the virtual power plant will not violate the safety operation constraints of the virtual power plant, which is conducive to improving the safety and economy of the power system.

Figure 4:
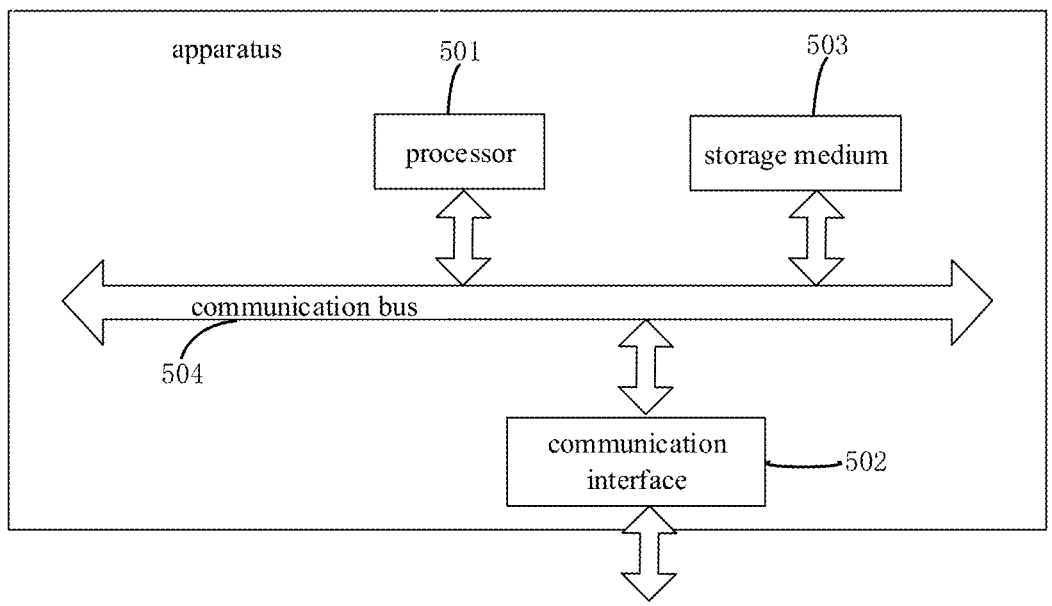
FIG. 4 is a block diagram of an apparatus for identifying a power feasible region of a virtual power plant according to some embodiments of the disclosure.

FIG. 4 is a block diagram of an apparatus for identifying a power feasible region of a virtual power plant according to some embodiments of the disclosure.

As illustrated in FIG. 4, the apparatus may include a processor 501, a communication interface 502, a memory 503, and a communication bus 504. The processor 501, the communication interface 502 and the memory 503 may communicate with each other through the communication bus 504. The processor 501 may call logic instructions from the memory 503, to carry out the above method, which is omitted herein.

In addition, the above-mentioned logic instructions in the memory 503 may be implemented in a form of software functional units and sold or used as an independent product, which may be stored in a computer readable storage medium. Based on this understanding, technical solutions of the disclosure essentially, or the part that contributes to the existing technology, or the part of the technical solutions may be embodied in a form of software product. The software product is stored in a storage medium, including several instructions configured to make a computer device (which may be a personal computer, a server, or a network device, etc.) to execute all or part of the actions of the methods described in the various embodiments of the disclosure. The storage medium may include a U disk, a mobile hard disk, a read-only memory (ROM), a random-access memory (RAM), a magnetic disk, an optical disk, and other media that can store program codes.

A non-transitory computer-readable storage medium is also provided in embodiments of the disclosure. The non-transitory computer-readable storage medium stores computer instructions. The computer instructions may cause a computer to execute the methods provided in the foregoing method embodiments.

Through the description of the above implementation manners, those of ordinary skill in the art may clearly understand that each implementation manner may be implemented by means of software plus a necessary general hardware platform, or may be implemented by hardware. Based on this understanding, the above technical solutions essentially or the part that contributes to the existing technology may be embodied in a form of software product, and the software product may be stored in a computer-readable storage medium, such as ROM/RAM, a magnetic disk, an optical disc, etc. The software product may include several instructions to make a computer device (which may be a personal computer, a server, or a network device, etc.) to execute the methods described in each embodiment or some parts of the embodiments.

Finally, it should be noted that the above embodiments described herein are only used to illustrate the technical solutions of the disclosure, and shall not be construed to limit the disclosure. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for identifying a power feasible region of a virtual power plant of a power system, wherein the virtual power plant comprises an internal power-distribution system, and the method comprises:
   S1, obtaining operation basic data of the internal power-distribution system;
   S2, establishing a static safety-constrained model of the virtual power plant based on the operation basic data, in which the static safety-constrained model is based on alternating current power flow equations;
   S3, establishing a power feasible region model of the virtual power plant based on the static safety-constrained model;
   S4, obtaining the power feasible region of the virtual power plant by calculating the power feasible region model based on the operation basic data and a feasible region vertex enumeration algorithm, wherein the power feasible region of the virtual power plant is a bounded area within a two-dimensional space; and
   dispatching the power system to adjust active and reactive power of the internal power-distribution system of the virtual power plant to clear a power spot market within the bounded area of the power feasible region.

2. The method of claim 1, wherein the operation basic data comprises:
   a connection topology of the internal power-distribution system,
   a conductance and a susceptance of each of branches in the internal power-distribution system,
   a conductance and a susceptance of a transformer in the internal power-distribution system,
   a transmission capacity limit of each of the branches,
   upper and lower limits of node voltage allowed for safe operation,
   upper and lower limits of active and reactive power of each of distributed powers in the internal power-distribution system, and
   predicted active and reactive loads of each of load nodes in the internal power-distribution system.

3. The method of claim 1, wherein the static safety-constrained model is denoted by formulas of:

$$P_{ij}^f = g_{ij}(v_i^2 - v_i v_j \cos\theta_{ij}) - b_{ij} v_i v_j \sin\theta_{ij}, i \in L, j \in L_i \quad (1)$$

$$Q_{ij}^f = -b_{ij}(v_i^2 - v_i v_j \cos\theta_{ij}) - g_{ij} v_i v_j \sin\theta_{ij}, i \in L, j \in L_i \quad (2)$$

$$P_i^g - P_i^d = \sum_{j \in L_i} P_{ij}^f, P_0 = \sum_{j \in L_0} P_{j0}, i \in L \quad (3)$$

$$Q_i^g - Q_i^d = \sum_{j \in L_i} Q_{ij}^f, Q_0 = \sum_{j \in L_0} Q_{j0}^f, i \in L \quad (4)$$

$$(P_{ij}^f)^2 + (Q_{ij}^f)^2 \le (\overline{S}_{ij})^2, (P_0)^2 + (Q_0)^2 \le (\overline{S}_0)^2, i \in L, j \in L_i \quad (5)$$

$$\underline{v}_i \le v_i \le \overline{v}_i, i \in L \quad (6)$$

$$\underline{P}_i^g \le P_i^g \le \overline{P}_i^g, \underline{Q}_i^g \le Q_i^g \le \overline{Q}_i^g, i \in L \quad (7)$$

where,
$P_{ij}^f$ represents an active power flow of branch ij connecting directly node i and node j;
$Q_{ij}^f$ represents a reactive power flow of branch ij;
$b_{ij}$ represents a susceptance of branch ij;
$g_{ij}$ represents a conductance of branch ij;
$v_i$ represents a voltage amplitude of node i;
$v_j$ represents a voltage amplitude of node j;
$\theta_{ij}$ represents a difference of voltage phase angles between node i and node j;
L represents a set of nodes;
$L_i$ represents a set of nodes directly connected to node i through branches;
$P_i^g$ represents an active power output of node i;
$Q_i^g$ represents a reactive power output of node i;
$P_i^d$ represents an active power load of node i;
$Q_i^d$ represents a reactive power load of node i;
$P_0$ represents an active power output of the virtual power plant;
$Q_0$ represents a reactive power output of the virtual power plant;
$\overline{S}_{ij}$ represents an upper transmission capacity limit of branch ij;
$\overline{S}_0$ represents an upper transmission capacity limit of a transformer;
$\underline{v}_i$ represents a lower limit of the voltage amplitude of node i;

$\bar{v}_i$ represents an upper limit of the voltage amplitude of node i;

$\underline{P}_i^g$ represents a lower limit of the active power output of node i;

$\bar{P}_i^g$ represents an upper limit of the active power output of node i;

$\underline{Q}_i^g$ represents a lower limit of the reactive power output of node i; and $\bar{Q}_i^g$ represents an upper limit of the reactive power output of node i.

4. The method of claim 3, wherein S3 comprises:

S31, determining a static safety-constrained feasible region of the virtual power plant based on the static safety-constrained model, in which the static safety-constrained feasible region is denoted by a formula of:

$$\Omega = \{(v, \theta, P^g, Q^g, P_0, Q_0) | s.t. (1)\sim(7)\} \quad (8)$$

where, $\Omega$ represents the static safety-constrained feasible region;

v represents a vector with $v_i$ as elements, $\theta$ represents a vector with $\theta_i$ as elements, $P^g$ represents a vector with $P_i^g$ as elements, $Q^g$ represents a vector with $Q_i^g$ as elements; and S32, aggregating the static safety-constrained model by eliminating internal state variables v and $\theta$, and internal decision variables $P^g$ and $Q^g$ of the virtual power plant, into the power feasible region model, in which the power feasible region model is related to the active power output of the virtual power plant and the reactive power output of the virtual power plant, and the power feasible region model is denoted by a formula of:

$$\Phi = \left\{ (P_0, Q_0) \middle| \begin{array}{l} \exists (v, \theta, P^g, Q^g), \\ s.t. \ (v, \theta, P^g, Q^g, P_0, Q_0) \in \Omega \end{array} \right\} \quad (9)$$

where, $\Phi$ represents the power feasible region.

5. The method of claim 4, wherein S4 comprises:

S41, setting an error limit $\varepsilon$ of the power feasible region;

S42, calculating a set of initial vertices and an initial approximate polygon of the power feasible region $\Phi$ based on the operation basic data;

in which the set of initial vertices of the power feasible region $\Phi$ comprises 4 feasible region vertices and is calculated by solving an optimization problem of:

$$\max \alpha_P^{(m)} \cdot P_0 + \alpha_Q^{(m)} \cdot Q_0$$

$$s.t. (v, \theta, P^g, Q^g, P_0, Q_0) \in \Omega \quad (10)$$

where, $(\alpha_P^{(m)}, \alpha_Q^{(m)})$ represents coefficients of an objective function of the optimization problem, values of $(\alpha_P^{(m)}, \alpha_Q^{(m)})$ are taken as (1,1), (1, −1), (−1, 1), and (−1, −1) in sequence, and the equation (10) is solved through a nonlinear optimization algorithm or calling a nonlinear optimization solver to obtain a corresponding optimal solution of the optimization problem as $v_m = (P_0^{(m)}, Q_0^{(m)})^T$, $v_m$ is the $m^{th}$ initial vertex; a set $V_0 = \{v_1, v_2, v_3, v_4\}$ is formed by initial vertices, and a set of feasible region vertices is initialized as $V = V_0$; a set of equations for each boundary of a polygon formed by the initial vertices is recorded as $F^T$; an average value of the vertices in $V_0$ is calculated as $v_0 = (P_0^{(0)}, Q_0^{(0)})^T = (v_1 + v_2 + v_3 + v_4)/4$;

S43, initializing a set $F^N$ of newly added boundaries to be an empty set: $F^N \leftarrow \emptyset$;

S44, searching for boundary vertices of the power feasible region $\Phi$ by shifting boundaries in $F^T$ outward, in which for the $k^{th}$ boundary in $\Phi$, a boundary equation is denoted by $f^{(k)}: \alpha_P^{(k)} \cdot P_0 + \alpha_Q^{(k)} \cdot Q_0 = \beta^{(k)}$, and vertices at both ends of the boundary are $v_1^{(k)}$ and $v_2^{(k)}$, and a search model is denoted by:

$$\max \alpha_P^{(k)} \cdot P_0 + \alpha_Q^{(k)} \cdot Q_0$$

$$s.t. (v, \theta, P^g, Q^g, P_0, Q_0) \in \Omega \quad (11)$$

the search model is solved by the nonlinear optimization algorithm or calling the nonlinear optimization solver to obtain a solution of vertexes as $v_k = (P_0^{(k)}, Q_0^{(k)})^T$, and an optimal value of the vertexes is recorded as $g_k^{max}$;

S45, adding the solution of vertexes to the set v of feasible region vertices;

S46, judging whether it is necessary to increase a boundary to be translated according to the error limit $\varepsilon$ and an improvement amount of search in S44;

S461, the improvement amount in step S44 is denoted by:

$$\Delta g_k = \frac{g_k^{max} - \beta^{(k)}}{\beta^{(k)} - (\alpha_P^{(k)} \cdot P_0^{(0)} + \alpha_Q^{(k)} \cdot Q_0^{(0)})} \quad (12)$$

S462, when $\Delta g_k > \varepsilon$, calculating line equations $f_1^{(k)}$ and $f_2^{(k)}$ of $v_k$ with $v_1^{(k)}$ and $v_2^{(k)}$, adding $f_1^{(k)}$ and $f_2^{(k)}$ into $F^N$, and returning to step S44, and using the $(k+1)^{th}$ boundary to perform a vertex search;

S463, when $\Delta g_k \leq \varepsilon$, returning to step S44, using the $(k+1)^{th}$ boundary to perform a vertex search;

S47, after performing the vertex search on all boundaries in $F^T$, judging whether $F^T$ is an empty set;

S471, when $F^T$ is not the empty set, updating $F^T$ to $F^N$;

S472, when $F^T$ is the empty set, ending and determining the polygon according to the vertices in v, and determining the power feasible region according to the determined polygon.

6. An apparatus for identifying a power feasible region of a virtual power plant of a power system, wherein the virtual power plant comprises an internal power-distribution system, and the apparatus comprises:

a memory;

a processor; and a computer program stored on the memory and capable of running on the processor, wherein the processor is configured to perform actions of:

S1, obtaining operation basic data of the internal power-distribution system;

S2, establishing a static safety-constrained model of the virtual power plant based on the operation basic data, in which the static safety-constrained model is based on alternating current power flow equations;

S3, establishing a power feasible region model of the virtual power plant based on the static safety-constrained model;

S4, obtaining the power feasible region of the virtual power plant by calculating the power feasible region model based on the operation basic data and a feasible region vertex enumeration algorithm, wherein the power feasible region of the virtual power plant is a bounded area within a two-dimensional space; and dispatching the power system to adjust active and reactive power of the internal power-distribution system of the virtual power plant to clear a power spot market within the bounded area of the power feasible region.

7. The apparatus of claim 6, wherein the operation basic data comprises:
 a connection topology of the internal power-distribution system,
 a conductance and a susceptance of each of branches in the internal power-distribution system,
 a conductance and a susceptance of a transformer in the internal power-distribution system,
 a transmission capacity limit of each of the branches,
 upper and lower limits of node voltage allowed for safe operation,
 upper and lower limits of active and reactive power of each of distributed powers in the internal power-distribution system, and
 predicted active and reactive loads of each of load nodes in the internal power-distribution system.

8. The apparatus of claim 6, wherein the static safety-constrained model is denoted by formulas of:

$$P_{ij}^f = g_{ij}(v_i^2 - v_i v_j \cos\theta_{ij}) - b_{ij} v_i v_j \sin\theta_{ij}, i \in L, j \in L_i \quad (1)$$

$$Q_{ij}^f = -b_{ij}(v_i^2 - v_i v_j \cos\theta_{ij}) - g_{ij} v_i v_j \sin\theta_{ij}, i \in L, j \in L_i \quad (2)$$

$$P_i^g - P_i^d = \sum_{j \in L_i} P_{ij}^f, P_0 = \sum_{j \in L_0} P_{j0}, i \in L \quad (3)$$

$$Q_i^g - Q_i^d = \sum_{j \in L_i} Q_{ij}^f, Q_0 = \sum_{j \in L_0} Q_{j0}^f, i \in L \quad (4)$$

$$(P_{ij}^f)^2 + (Q_{ij}^f)^2 \leq (\overline{S}_{ij})^2, (P_0)^2 + (Q_0)^2 \leq (\overline{S}_0)^2, i \in L, j \in L_i \quad (5)$$

$$\underline{v}_i \leq v_i \leq \overline{v}_i, i \in L \quad (6)$$

$$\underline{P}_i^g \leq P_i^g \leq \overline{P}_i^g, \underline{Q}_i^g \leq Q_i^g \leq \overline{Q}_i^g, i \in L \quad (7)$$

where,
 $P_{ij}^f$ represents an active power flow of branch ij connecting directly node i and node j;
 $Q_{ij}^f$ represents a reactive power flow of branch ij;
 $b_{ij}$ represents a susceptance of branch ij;
 $g_{ij}$ represents a conductance of branch ij;
 $v_i$ represents a voltage amplitude of node i;
 $v_j$ represents a voltage amplitude of node j;
 $\theta_{ij}$ represents a difference of voltage phase angles between node i and node j; L represents a set of nodes;
 $L_i$ represents a set of nodes directly connected to node i through branches;
 $P_i^g$ represents an active power output of node i;
 $Q_i^g$ represents a reactive power output of node i;
 $P_i^d$ represents an active power load of node i;
 $Q_i^d$ represents a reactive power load of node i;
 $P_0$ represents an active power output of the virtual power plant;
 $Q_0$ represents a reactive power output of the virtual power plant;
 $\overline{S}_{ij}$ represents an upper transmission capacity limit of branch ij;
 $\overline{S}_0$ represents an upper transmission capacity limit of a transformer;
 $\underline{v}_i$ represents a lower limit of the voltage amplitude of node i;
 $\overline{v}_i$ represents an upper limit of the voltage amplitude of node i;
 $\underline{P}_i^g$ represents a lower limit of the active power output of node i;
 $\overline{P}_i^g$ represents an upper limit of the active power output of node i;
 $\underline{Q}_i^g$ represents a lower limit of the reactive power output of node i; and
 $\overline{Q}_i^g$ represents an upper limit of the reactive power output of node i.

9. The apparatus of claim 8, wherein S3 comprises:
 S31, determining a static safety-constrained feasible region of the virtual power plant based on the static safety-constrained model, in which the static safety-constrained feasible region is denoted by a formula of:

$$\Omega = \{(v,\theta,P^g,Q^g,P_0,Q_0) | s.t.(1)\sim(7)\} \quad (8)$$

where,
 $\Omega$ represents the static safety-constrained feasible region;
 v represents a vector with $v_i$ as elements,
 $\theta$ represents a vector with $\theta_i$ as elements,
 $P^g$ represents a vector with $P_i^g$ as elements,
 $Q^g$ represents a vector with $Q_i^g$ as elements; and S32, aggregating the static safety-constrained model by eliminating internal state variables v and $\theta$, and internal decision variables $P^g$ and $Q^g$ of the virtual power plant, into the power feasible region model, in which the power feasible region model is related to the active power output of the virtual power plant and the reactive power output of the virtual power plant, and the power feasible region model is denoted by a formula of:

$$\Phi = \left\{ (P_0, Q_0) \,\middle|\, \begin{array}{l} \exists\, (v, \theta, P^g, Q^g), \\ s.t.\ (v, \theta, P^g, Q^g, P_0, Q_0) \in \Omega \end{array} \right\} \quad (9)$$

where, $\Phi$ represents the power feasible region.

10. The apparatus of claim 9, wherein S4 comprises:
 S41, setting an error limit $\varepsilon$ of the power feasible region;
 S42, calculating a set of initial vertices and an initial approximate polygon of the power feasible region $\Phi$ based on the operation basic data;
 in which the set of initial vertices of the power feasible region $\Phi$ comprises 4 feasible region vertices and is calculated by solving an optimization problem of:

$$\max \alpha_P^{(m)} \cdot P_0 + \alpha_Q^{(m)} \cdot Q_0$$

$$s.t.(v,\theta,P^g,Q^g,P_0,Q_0) \in \Omega \quad (10)$$

where, $(\alpha_P^{(m)}, \alpha_Q^{(m)})$ represents coefficients of an objective function of the optimization problem, values of $(\alpha_P^{(m)}, \alpha_Q^{(m)})$ are taken as (1,1), (1, −1), (−1, 1), and (−1, −1) in sequence, and the equation (10) is solved through a nonlinear optimization algorithm or calling a nonlinear optimization solver to obtain a corresponding optimal solution of the optimization problem as $v_m = (P_0^{(m)}, Q_0^{(m)})^T$, $v_m$ is the $m^{th}$ initial vertex; a set $V_0 = \{v_1, v_2, v_3, v_4\}$ is formed by initial vertices, and a set of feasible region vertices is initialized as $V = V_0$; a set of equations for each boundary of a polygon formed by the initial vertices is recorded as $F^T$; an average value of the vertices in $V_0$ is calculated as $v_0 = (P_0^{(0)}, Q_0^{(0)})^T = (v_1 + v_2 + v_3 + v_4)/4$;

S43, initializing a set $F^N$ of newly added boundaries to be an empty set: $F^N \leftarrow \emptyset$;

S44, searching for boundary vertices of the power feasible region $\Phi$ by shifting boundaries in $F^T$ outward, in which for the $k^{th}$ boundary in $\Phi$, a boundary equation is denoted by $f^{(k)}: \alpha_P^{(k)} \cdot P_0 + \alpha_Q^{(k)} \cdot Q_0 = \beta^{(k)}$, and vertices at both ends of the boundary are $v_1^{(k)}$ and $v_2^{(k)}$, and a search model is denoted by:

$$\max \alpha_P^{(k)} \cdot P_0 + \alpha_Q^{(k)} \cdot Q_0$$

$$s.t. (v, \theta, P^g, Q^g, P_0, Q_0) \in \Omega \tag{11}$$

the search model is solved by the nonlinear optimization algorithm or calling the nonlinear optimization solver to obtain a solution of vertexes as $v_k = (P_0^{(k)}, Q_0^{(k)})^T$, and an optimal value of the vertexes is recorded as $g_k^{max}$;

S45, adding the solution of vertexes to the set v of feasible region vertices;

S46, judging whether it is necessary to increase a boundary to be translated according to the error limit $\varepsilon$ and an improvement amount of search in S44;

S461, the improvement amount in step S44 is denoted by:

$$\Delta g_k = \frac{g_k^{max} - \beta^{(k)}}{\beta^{(k)} - (\alpha_P^{(k)} \cdot P_0^{(0)} + \alpha_Q^{(k)} \cdot Q_0^{(0)})} \tag{12}$$

S462, when $\Delta g_k > \varepsilon$, calculating line equations $f_1^{(k)}$ and $f_2^{(k)}$ of $v_k$ with $v_1^{(k)}$ and $v_2^{(k)}$, adding $f_1^{(k)}$ and $f_2^{(k)}$ into $F^N$, and returning to step S44, and using the $(k+1)^{th}$ boundary to perform a vertex search;

S463, when $\Delta g_k \leq \varepsilon$, returning to step S44, using the $(k+1)^{th}$ boundary to perform a vertex search;

S47, after performing the vertex search on all boundaries in $F^T$, judging whether $F^T$ is an empty set;

S471, when $F^T$ is not the empty set, updating $F^T$ to $F^N$;

S472, when $F^T$ is the empty set, ending and determining the polygon according to the vertices in v, and determining the power feasible region according to the determined polygon.

* * * * *